INVENTORS
John W. Dunning
Alexander K. Moses Jr.
Michael J. Toth
BY
Hyde, Meyer, Baldwin & Doran
ATTORNEYS Jan. 29, 1957 J. W. DUNNING ET AL 2,779,724
HIGH VELOCITY FILM HEAT EXCHANGER
Filed April 5, 1955 4 Sheets-Sheet 2

INVENTORS
John W. Dunning
Alexander K. Moses Jr.
Michael J. Toth
BY
Hyde, Meyer, Baldwin & Doran
ATTORNEYS Jan. 29, 1957    J. W. DUNNING ET AL    2,779,724
HIGH VELOCITY FILM HEAT EXCHANGER
Filed April 5, 1955    4 Sheets-Sheet 3

INVENTORS
John W. Dunning
Alexander K. Moses Jr.
Michael J. Toth
BY
Hyde, Meyer, Baldwin & Doran
ATTORNEYS Jan. 29, 1957  J. W. DUNNING ET AL  2,779,724
HIGH VELOCITY FILM HEAT EXCHANGER
Filed April 5, 1955  4 Sheets-Sheet 4

INVENTORS
John W. Dunning
Alexander K. Moses Jr.
Michael J. Toth
BY
Hyde, Meyer, Baldwin & Doran
ATTORNEYS

United States Patent Office 2,779,724
Patented Jan. 29, 1957

2,779,724

HIGH VELOCITY FILM HEAT EXCHANGER

John W. Dunning, Lakewood, Alexander K. Moses, Jr., Elyria, and Michael J. Toth, Cleveland, Ohio, assignors, by mesne assignments, to International Basic Economy, New York, N. Y., a corporation of New York Application April 5, 1955, Serial No. 499,322

18 Claims. (Cl. 202—236)

This invention relates to apparatus for separating more readily evaporatable fractions from liquids having two or more such fractions with respectively different boiling points. The invention relates more specifically to means for achieving such separation at high velocity.

In one preferred embodiment of the invention, hereinafter to be more specifically described, the invention is shown as applied to the stripping of volatile solvent from miscella products of the vegetable oil recovery industry. Those skilled in the art will be familiar with the solvent extraction of oil from soya beans, cottonseed, flaxseed, and the like, wherein the solvent must be separated from the product oil after extraction. The invention of course is applicable to removal of solvent fractions from oils derived from both edible and non-edible oils and fats.

The effectiveness of evaporating apparatus for separating more volatile from less volatile fluids may be stated in terms of the rate of heat transferred to the liquid being stripped. This rate of heat transfer is equal to the area of the heating surface exposed to contact with the liquid, times the mean temperature difference between the said surface and the liquid, times the overall rate of heat transfer coefficient. Since the area of the effective heating surface, and the said mean temperature difference may be easily predetermined, the rate of heat transfer in an evaporator becomes finally dependent upon the overall rate of heat transfer coefficient. This coefficient is a function of the velocity of the liquid along the heating surface, and is inversely proportional to the viscosity of the liquid. It will be apparent of course, that the highest evaporating and stripping efficiency is achieved by flowing a thin film of the liquid to be stripped (which liquid has a more volatile and a less volatile component) along a surface heated sufficiently to vaporize the more volatile component, but not the less volatile component, at a speed predetermined to achieve maximum stripping efficiency and improved volumetric yield.

An object of the present invention is to provide a novel and improved centrifugal high velocity film evaporator and stripper of a non-rotative type for the separation of a volatile solvent from solution in a less volatile solvent.

A further object is to provide a multistage high velocity centrifugal film evaporator for stripping a liquid from another liquid of higher boiling point.

A further object of the invention is to provide an evaporator capable of operating at much higher vapor velocity than hitherto attainable in evaporators known in the art.

A further object of the invention is to provide an evaporator of high linear film velocity so that a relatively short evaporator may afford a relatively long path of travel for the liquid being stripped, whereby to provide a cheaper unit occupying less space in a plant.

A further object of the invention is to provide an evaporator which is self-cleaning, since the cleanliness of the heat transfer surface plays an important part in the overall heat transfer coefficient of the apparatus.

Another object of the invention is to provide an evaporator especially adapted for critical control of the viscosity and temperature of the liquid to be stripped. The reason for this will later appear.

Another object of the invention is to provide an evaporator wherein foaming of the liquid does not occur. Foam causes a reduction in the overall rate of heat transfer coefficient, since foam consists of stable bubbles of the evaporating liquid, and when occurring in the evaporating space it carries some liquid away from the heating surface, so as to cause a reduction in the overall rate of heat transfer coefficient.

Another object of the invention is to provide an evaporator of high film velocity which will provide for the evaporation of liquids which yield crystals or precipitates upon evaporation, or which initially hold solids in suspension.

A further object of the invention is to provide an evaporator of high vapor and film velocities which will yield thin films of uniform thickness on the heat transfer surface without the use of high speed mechanical agitators.

As previously remarked, it should be borne in mind that increased output is a desideratum, and that the velocity of the liquid over the heat transfer surface, which is self cleaning, is an important factor.

Among the evaporators heretofore known in the art, the several more important ones may be briefly characterized. We may mention here, by their conventionally recognized names, the vertical rising film evaporator; the short tube evaporator with propeller agitator and the forced circulation evaporator which is quite similar; and the Turba-film evaporator.

The minimum and maximum vapor velocities available in the rising film evaporator, which should be operated with a liquid level in the bottom of the evaporator tubes, are approximately fifteen to thirty feet per second. The qualitative effect of the liquid head on the depression of the vapor pressure, and consequently the boiling point, is recognized, because such depression results in a decrease of the total mean temperature difference between the boiling point of the liquid being stripped and the temperature of the heating medium, which in turn results in a virtual decrease in the overall heat transfer coefficient of the rising film evaporator. Our invention does not carry a head of liquid, and consequently is not handicapped in this manner.

The vapor velocity obtainable in forced circulation evaporators is established only after weighing a number of factors. One of these unfavorable factors is the increase in power required to increase the velocity of the liquid. Because of power limitations, liquid velocities in the range of five to ten feet per second are usual.

The Turba-film evaporator employs a controlled speed agitator extending down through the entire axis of the evaporator. The rotor blades of this agitator extend to within about 1/32" of the heat transfer wall. The liquid is fed into the top of the evaporator section, and then whirled against the heated wall by the rotor blades of the agitator. After the liquid entering the evaporator leaves the rotors of the agitator and contacts the evaporator wall, this liquid receives little, if any, further rotative energy and travels to the outlet influenced only by gravity, except of course that when the falling film builds up to exceed the space between the wall and the rotors, the said rotors again will impart an agitation or impulse to the affected part of the liquid. In such unit, apart from gravity which is more or less a factor depending on viscosity, the maximum velocity of the liquid is reduced to such velocity as is obtainable from the agitator. In addition, it is a disadvantage that the film varies in thickness, and consequently the heat transfer effect varies.

In contrast to the evaporators just characterized, and others known to the art, our present evaporator attains vapor velocities in the range of fifty to one hundred feet per second.

Referring now to the drawings illustrating several embodiments of our invention:

Figures 1, 2, 3:
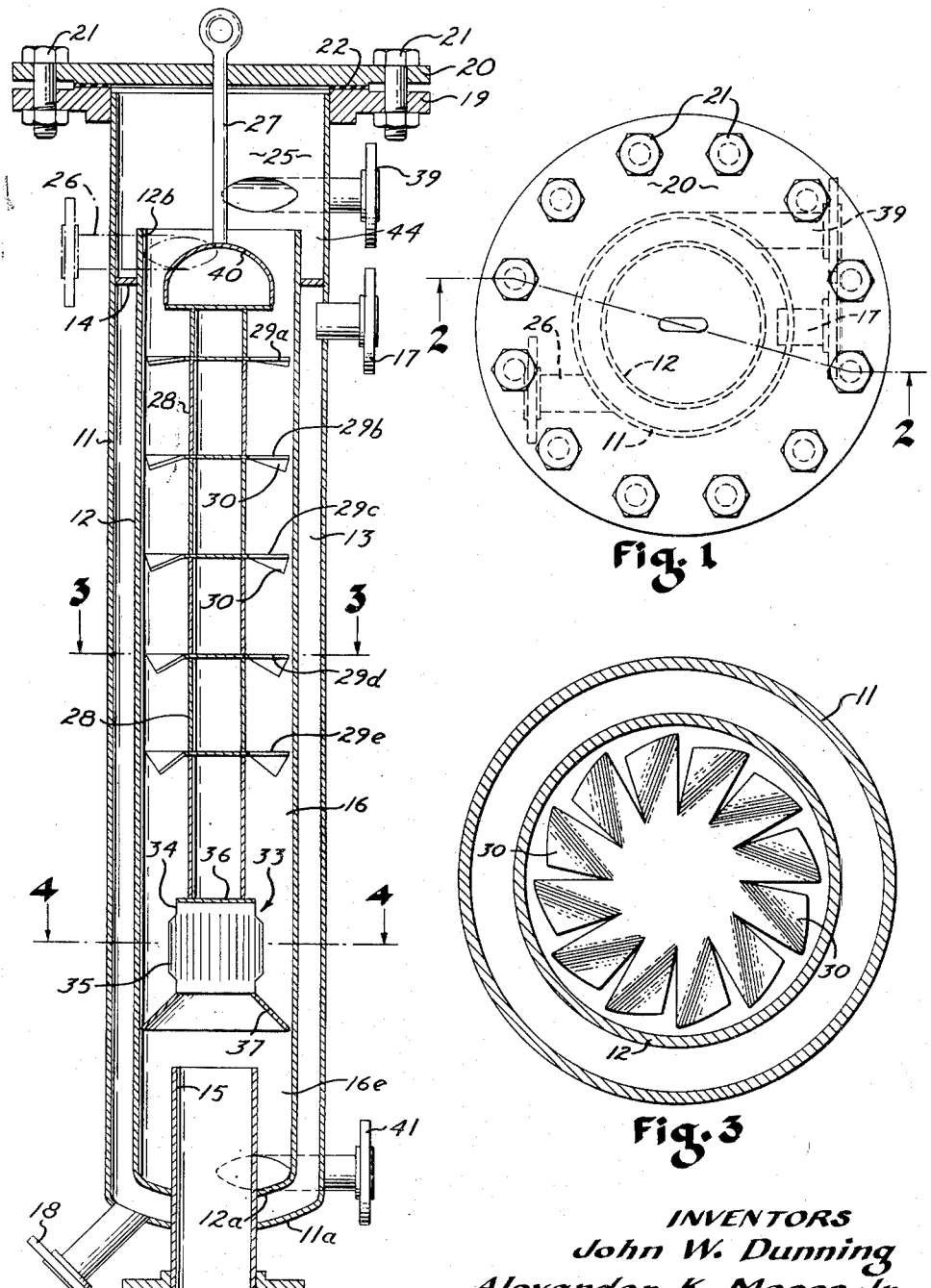
Fig. 1 is a top plan view of an evaporator embodying our invention.
Fig. 2 is a vertical sectional view taken on the line 2—2 of Fig. 1.
Figure 4:
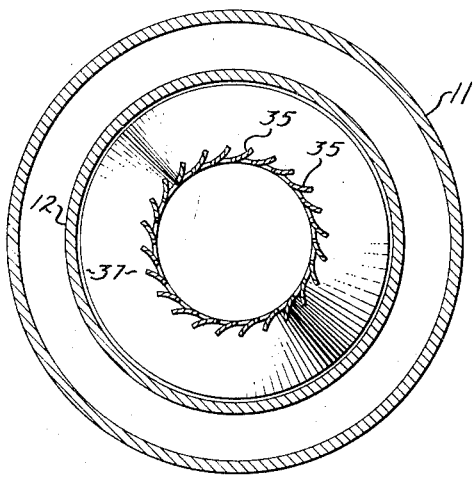

Figs. 3 and 4 are transverse sectional views taken respectively on the lines 3—3 and 4—4 of Fig. 2.

Figure 5:
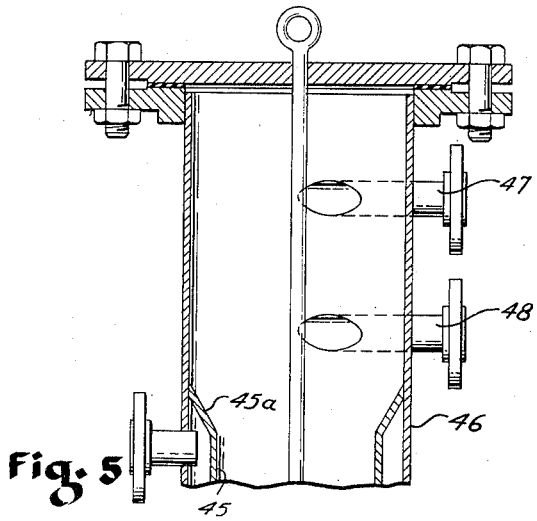

Fig. 5 is a fragmentary vertical sectional view of the upper portion of an evaporator constituting another embodiment of our invention.

Figure 6:
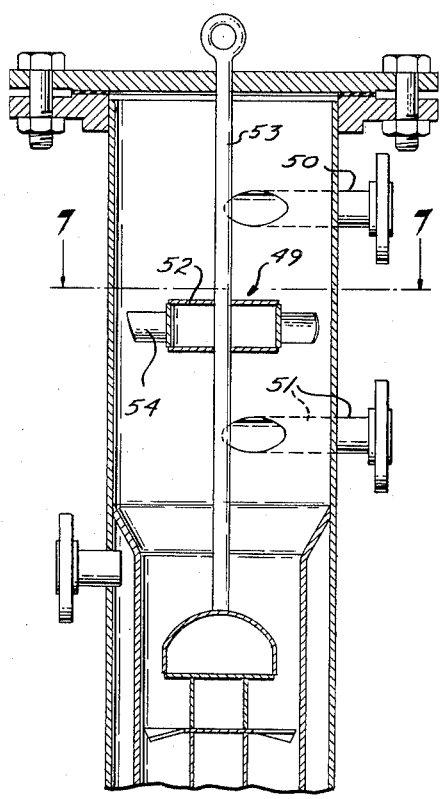

Fig. 6 is a view similar to Fig. 5, but constituting another embodiment of our invention.

Figure 7:
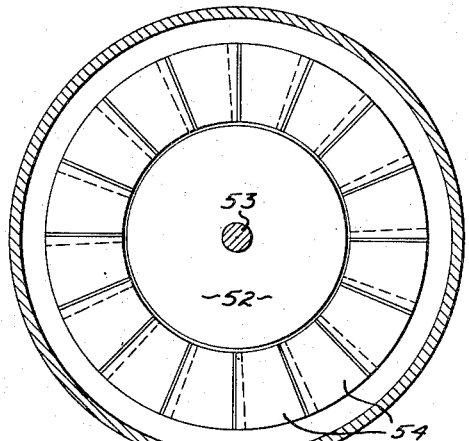

Fig. 7 is a sectional view, somewhat enlarged, taken on the line 7—7 of Fig. 6.

Figure 8:
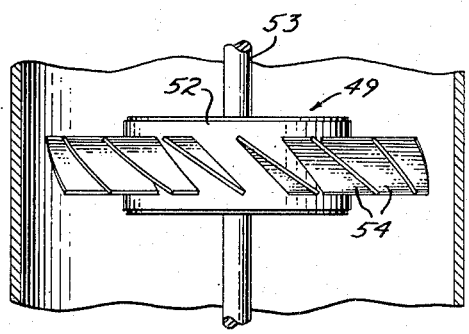

Fig. 8 shows, in side elevation, the apparatus shown in Fig. 7.

Figure 9:
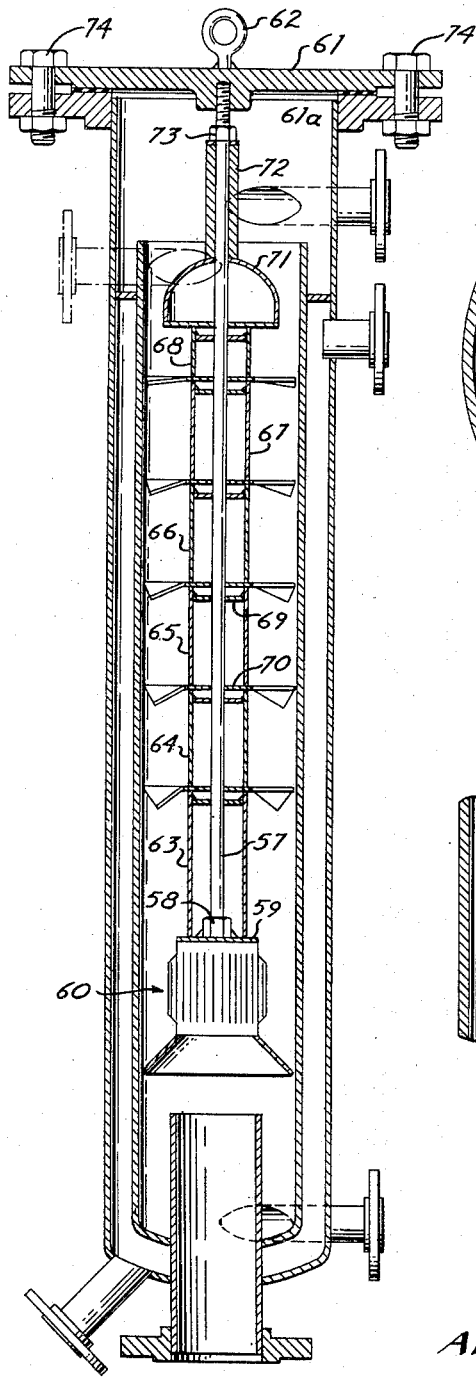

Fig. 9 is a vertical sectional view similar to Fig. 2, but showing yet another embodiment of our invention.

Figure 10:
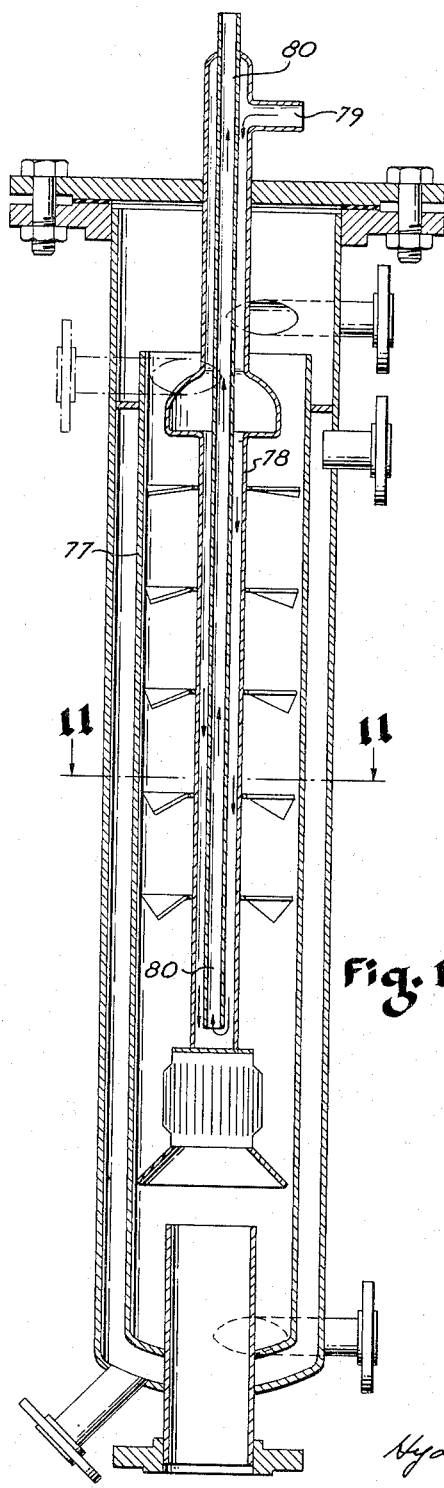

Fig. 10 is a vertical sectional view similar to Fig. 2, but showing still another embodiment of our invention.

Figure 11:
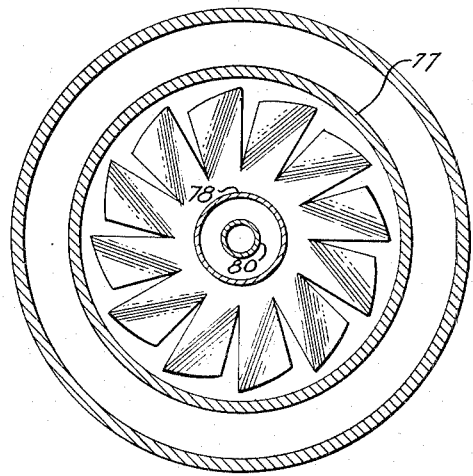

Fig. 11 is a transverse sectional view taken approximately on the line 11—11 of Fig. 10.

Referring now to Figs. 1 to 4, and somewhat more specifically for the moment to Fig. 2, we show an evaporator comprising an outer tubular wall 11 and an inner tubular wall 12 maintained concentrically to provide a peripheral chamber 13 which serves as a steam chest. For this purpose, the two tubular walls are maintained in concentric relationship at the top end by an annular spacer wall 14, which seals the steam jacket chamber at the top. At the bottom both tubular walls extend inwardly to constitute end heads 11a and 12a, these end heads being apertured axially to receive a discharge conduit 15 which extends inwardly into the lower end 16e of the inner cylindrical chamber 16. Steam for heating purposes enters the inlet fitting 17 and condensate leaves by outlet fitting 18. Means, not shown, is provided for supplying steam at any predetermined temperature and pressure to fitting 17, and for disposing of the condensate leaving fitting 18.

At the top the evaporator has fixed thereto, by welding or otherwise, a connector flange 19. The evaporator is capped by a plate 20 connected to flange 19 by a plurality of bolts 21. A gasket 22 helps to seal the assembly.

The wall 12 below spacer 14 is of course heated by the steam in chest 13 and its inner face serves as a heat transfer surface for evaporating the more volatile fraction of the miscella which enters upper chamber 25 at an inlet port in fitting 26 and is impelled downwardly within wall 12 in a manner now to be described.

Suspended within chamber 16 by means of a link rod 27 is a centrifugal non-rotative separator assembly. This assembly comprises a central tube 28, axially disposed, having at vertically spaced points a plurality of deflector elements 29a, 29b, 29c, 29d and 29e which are fixed to the tube but which have stamped-out vanes 30 bent along a diagonal, as best shown in Fig. 3, to provide deflector blades, the pitch of which increases progressively from the top element 29a to the bottom one 29e.

Carried at the lower end of tube 28 is another whirl inducing element or tuyere 33 which comprises a tubular body 34 slotted around its periphery (Fig. 4) to provide a peripherally spaced series of louvers 35. Tube 28 is attached to a plate 36 which closes the upper end of the tuyere. The lower end of the tuyere 33 is open and has an outwardly flared lip 37 which flares outwardly towards, but short of wall 12.

Operation of the device is as follows. A gas, which may be dry steam, superheated steam, volatile vapors, inert gases, or air, is introduced under positive or negative pressure, and preferably heated, into the tangentially inclined port 39. The tangential inclination of port 39 imparts a preliminary whirl to the stream of miscella which is simultaneously entering port 26 and flowing over wall 12b (the upward extension of wall 12) into chamber 16. The heated gas produces a high centrifugal and vortical velocity to the miscella and also begins to raise the temperature of the miscella. The domed cap 40 on top of tube 28 assists in the dispersion of the gas and liquid towards wall 12. Since the lower end of chamber 16 is open at outlet conduit 15, the pressure drop drives gas and liquid downwardly. The successive non-rotative elements 29a, 29b, etc., progressively supply additional vertical impetus, and a film of miscella descends along wall 12 with accelerating speed. Wall 12 of course is heated to a temperature above the volatilization point of the solvent fraction, which may, for example, be hexane, and the rapid volatilization of the solvent greatly increases the volume of vapor seeking an outlet.

By the time the liquid film reaches the liquid drain area around the outer periphery of conical lip 37, it has given up all the solvent previously therein, and the liquid passes down into annular chamber 16a and leaves by discharge conduit 41. Said drain area around the periphery of cone 37 is large enough to permit passage of the liquid. The solvent-gaseous stream leaving by conduit 15 is conveyed to condensation means for decantation. The product oil may, if desired, be subjected to further steps to separate any remaining traces of solvent, although the efficiency of this evaporator is such that it may be regarded as completely free from solvent.

The evaporator just described, and shown in Figs. 1 to 4, is self cleaning by reason of the high velocity of the transmitted liquid and gases. As previously indicated, linear gas speeds of fifty to one hundred feet per second may be attained with this separator. For periodic inspection, and cleaning, if desired, the bolts 21 may be removed, and plate 20 and the depending unit carried by rod 27 can be lifted out as a unit for ready access. This is convenient should it be deemed desirable to vary the spacing of deflectors 29a, 29b, etc., or to vary the pitch of the deflector vanes, or for any other reason.

The achievement of the objects of the invention hereinabove recited will now be apparent. The velocity of the boiling liquid along the heat transfer surface has been asserted as the critical factor in the overall heat transfer coefficient. The temperature in the steam chest and the temperature of the "carrier" gas may be adjusted as desired at their respective optimum levels. This separator is particularly adapted for this end since the prime motivating force within the unit is derived from the pressure drop across the unit, and the desired operating pressure can be obtained by setting the evaporating temperature for the preferred or optimum viscosity of the boiling liquid. The tendency to foaming is reduced since the boiling liquid impinges against the heating surface at high velocity, thereby breaking any stable bubbles before they have an opportunity to collect into foam.

Another embodiment of our invention is illustrated in Fig. 5. In this embodiment the "well" 44 of Fig. 2, into which the miscella was first introduced tangentially, has been eliminated by turning the inner wall 45 conically outwardly and upwardly at 45a to contact with outer wall 46. The "well" just mentioned was of course heated by steam chest 13 immediately thereunder, and the entering liquid had not yet attained sufficient impetus to be self cleaning under all conditions, so that successive films baked or coagulated on spacer 14, requiring occasional cleaning. In the embodiment shown in Fig. 5, there is no tendency to settling and no necessity for subsequent cleaning. In this embodiment the vapor entering the head of the evaporator at 47 is given an initial centrifugal velocity only by the design of the tangential inlet. This initial centrifugal velocity, depending on the physical nature of the liquid feed introduced tangentially at 48, is sufficient to impart a high whirling velocity to said liquid feed and to maintain an even distribution of this feed against walls 45a and 45 before the liquid descends to the evaporator section previously described, and shown in Fig. 2.

Figs. 6, 7 and 8 show a slightly modified form of the invention in which the embodiment of Fig. 5 has been changed by the introduction of a deflector 49 between the vapor inlet 50 and the liquid inlet 51. This deflector consists of a central drum 52 fixed on link rod 53, and having turbine-type blades 54 connected around its periphery to provide additional vortical impetus to the gas before it picks up the liquid entering at 51. The number and pitch of blades 54 may be preselected as desired, and if the drum be replaceably attached another may be substituted with such different blade arrangement whenever desirable.

In some types of liquid food processing, such as the evaporation of milk, the nature of the operation, or even rules or ordinances governing sanitation in particular locations, make thorough periodic cleaning a requirement. The embodiment shown in Fig. 9 makes this particularly convenient. In the previously described embodiments, for example the one shown in Fig. 2, the central tube 28 was either an integral one-piece element, or, if made from more than one length of tubing, was welded or otherwise connected into a fixed assembly.

In the embodiment of Fig. 9 we provide an assembly readily separatable into individual short units for easy cleaning. An axial tie-rod 57 is threaded into a nut 58 welded to the plate 59 constituting the closed end of tuyere 60. The upper end of the tie rod is threaded into a tapped hole in boss 61a of cover plate 61. Cover 61 has a convenient handle consisting of a ring 62 welded thereto. The central tube in this instance consists of an assembly of separate tube sections 63, 64, 65, 66, 67, 68. Each section, for example section 65, has a spacer plate 69 with a central aperture to slidably receive link rod 57. Section 65 also has fixed thereto one deflector 70 which also is centrally apertured to receive rod 57. In this way all tube sections may be successively positioned on rod 57 and will maintain their alignment. The deflector dome 71 at the top is also slidably threaded on rod 57. Above dome 71 there is telescoped a spacer bushing 72 which is tightened down by nut 73.

Removal and disassembly of this unit is accomplished in a manner readily apparent, and can easily be done beginning at either end of rod 57. For example, top bolts 74 may be removed and the complete central assembly lifted out. Top plate 61 is then unscrewed from rod 57 and nut 73 and bushing 72 taken off. Dome 71 and all tube sections 68, 67, etc., will fall off if the rod 57 is upended. The assembly, after lifting out, can also be disassembled by unscrewing the tuyere and nut from the lower end, after slacking off slightly on top assembly nut 73.

Figs. 10 and 11 show yet another embodiment of the invention wherein means is provided for furnishing a second heat transfer surface in addition to the wall 77 of the steam chest. Such second heat transfer surface is provided by the wall of a central tube 78 which is analogous to the tube 28 of Fig. 2, except that in the present instance steam is introduced through a pipe 79 into an upward extension 78a of tube 78. This proceeds downwardly through tube 78, and at the lower end condensate enters a pipe 80, and flows upwardly, and outwardly at the top end of pipe 80. The other structural features of this embodiment will require no explanation in view of the previous description of the other embodiments. By heating the central part of the elongated chamber we can bring the unit to operating equilibrium more rapidly, and can also effect more thorough and rapid evaporation of the downwardly moving liquid.

The high velocity film evaporator according to this invention makes use of a gas entering a cylindrical vessel above a liquid inlet in such a manner that the gas imparts a spiral motion to the liquid, creating a thin film on an evaporator wall. The gas can be introduced to the evaporator section at approximately fifty feet per second and increases in volume as evaporation continues so that the vapor velocity at the discharge section of the evaporator may be in the range of sixty to one hundred feet per second. Gravity is not relied upon to cause the liquid to flow downward through the evaporator. The centrifugal elements rather are pitched to furnish not only a centrifugal velocity around the evaporator wall, but also to furnish a directional flow toward the discharge of the evaporator. The design of the centrifugal elements and centrifugal motion of the vapors within the evaporator impart a rapid swirling motion to the liquid around the periphery of the evaporator and in the direction of the outlet of the evaporator. This means of imparting flow to the liquid along with the predetermined control of temperature, pressure, or vacuum, permits the evaporation of a component from a heavy viscous liquid with very little more hold up than that required for low viscous liquids. In addition, the high gas velocities make the gravitational forces within the unit of a minor order when compared to the energy of the gas itself. The high velocities also make it possible to obtain good separation in the separator section below the evaporator section.

It would also be apparent to those skilled in the art that the evaporator and separator, according to this invention, lends itself to fabrication in both the ferrous and non-ferrous metals, so that problems of strength and corrosion can be satisfactorily met. In addition, the inner surface of the evaporator wall can be made of those materials which furnish the maximum wettability to provide minimum film thicknesses and, therefore, maximum liquid velocities.

As an example of the operation of the evaporator, according to this invention, but in no way as a limitation thereof, an evaporator according to the principles of this invention was fabricated. This evaporator was fabricated with the same number of square feet of evaporating surface as utilized in a rising film evaporator capable of processing 15 gallons per hour of a liquid. This liquid consisted of 20% vegetable oils and 80% hexane. The liquid consisting of corn oil and hexane was pumped at 15 gallons per hour to the liquid inlet 26 of Fig. 1. Dry steam was admitted to the vapor inlet 39. Steam at 80 pound per square inch was admitted to the heat chest 13 of the evaporator. Under these conditions a vegetable oil issued from the liquid outlet 41 of the separator beneath the evaporator at a flash point higher than 215° F. The vapors from the evaporator were condensed; the hexane was decanted from the water and used for solvent extraction purposes. The flow of oil-hexane liquid was increased to the evaporator as in Figure 1 to a maximum of 50 gallons per hour. Simultaneously the flow of steam vapor was proportionately increased. It was observed that the flash point of the oil obtained from the separator discharge remained practically constant up to a flow rate of approximately 35 gallons per hour. At that point the flash points of the oil decreased so that at 50 gallons per hour the flash point of the oil was approximately 150° F.

Example 2. A miscella similar to that employed in Example 1 was mixed with proteinaceous fines from a vegetable oil extraction process. These fines amounted to approximately 2% by weight of the oil-hexane mixture. This liquid containing suspended solids was processed in the evaporator-separator for a period of 8 hours per day for three successive days, at a flow rate of 30 gallons per hour. The product oil from the three successive days run had a flash point higher than 215° F. Upon dismantling the evaporator at the completion of the three days test, no fines, deposition of solids or scaling of the evaporator walls was apparent.

By the above examples and description of the evaporator, according to this invention, it will be apparent to those skilled in the art that the evaporator, according to this invention, may be used for the evaporation of a single low boiling component from a single higher boiling component. It may be, in addition, used as a combination evaporator-stripper as required for the separation of particular solvents from vegetable oils. The evaporation-stripping effects are attained by utilizing stripping steam as the vapor or gas which imparts velocity to the evaporating liquid. In a similar manner, benzene may be employed as the vapor or gas for the production of absolute alcohol from 95% alcohol. In this operation the benzene would form an azeotrope with the water, thus removing the water from the alcohol as a vapor, producing absolute alcohol and a benzene-water-azeotrope, thereafter condensed and recovered.

It will also be apparent to those skilled in the art that the vapor or gas stream used to impart a high velocity to the liquid in the evaporator may be a vaporized liquid. It may, however, also be the vapor products from the evaporator which are reheated in the vapor stage and reused in the evaporator. The vapor or gas may also result from the combustion of a natural gas.

Because of the design of the evaporator according to the methods of this invention and the novel advantages which it provides, this evaporator may be used for the concentration of edible products, for example milk as mentioned in connection with Fig. 9. The high vapor and liquid velocities permit a high rate of evaporation with a very low liquid retention time. For example, in Examples 1 and 2, the liquid retention times were calculated to be approximately 2 seconds. In addition, by the utilization of high vacuums, distillations may be conducted at relatively low temperatures. It will further be apparent that the evaporator according to this invention may be utilized for the concentration of viscous liquids, for the concentration of liquids that tend to salt out during evaporation or which initially contain suspended solids.

This invention can also be used to produce glycerine, sugar, ammonia, powdered milk and powdered coffee. The evaporator-separator produces the thick liquor from which the powdered milk, coffee or other product is processed to a powder.

It may also be used for manufacture of any distillate product, or for manufacture of concentrate fruit juices of all kinds.

It is especially applicable to the evaporation of heat sensitive products, such as milk and related dairy products and fruit juices, etc. This is due to the short time the product is in contact with heat, and the fact that the temperature as stated above can be adjusted to optimum point for good work.

The principles of this invention can also be used in the transfer of heat, as in heat exchangers used as intercoolers and aftercoolers in compressed gas and vapor applications, or other adaptations of similar nature. It may also be noted that by the use of our equipment it is possible to separate liquid solutions containing inorganic salts up to fifty per cent by weight, or animal and vegetable matter up to ten percent by weight.

What we claim is:

1. Apparatus for vaporizing and separating a more volatile component from a less volatile component in a liquid, comprising an elongated generally cylindrical evaporator chamber having opposed inlet and discharge ends, a gas inlet port for admitting a carrier gas under pressure near said inlet end, a liquid inlet port for admitting said liquid near said inlet end, a gas outlet port near said discharge end, a liquid outlet port near said discharge end, heating means surrounding and extending along an intermediate portion of the chamber wall so as to make said intermediate portion a heat transfer surface, and a series of fixed elements spaced progressively along said chamber having deflector portions angularly inclined obliquely to the cylindrical axis and also inclined to a transverse plane normal to said axis, whereby to centrifugally impel said gas and liquid outwardly towards said heat transfer surface, whereby the more volatile component is vaporized and discharged through said gas outlet port.

2. Apparatus as defined in claim 1 wherein said gas inlet port and liquid inlet port are tangentially inclined at their respective points of entry to said chamber.

3. Apparatus as defined in claim 1 wherein said liquid inlet port is closer to the discharge end of said chamber than said gas inlet port.

4. Apparatus as defined in claim 1 wherein said gas outlet port is disposed in the center of said discharge end, and axially with respect to the length of said chamber.

5. Apparatus as defined in claim 1 wherein said liquid outlet port is tangentially inclined at its point of exit from said chamber.

6. Apparatus as defined in claim 1 wherein additional deflector means is disposed near the inlet end of said chamber between said gas inlet port and said liquid inlet port, and wherein said liquid inlet port is closer to the discharge end of said chamber than said additional deflector means.

7. Apparatus as defined in claim 1 wherein a tuyere is disposed in said chamber between the said deflector elements and the discharge ports, said tuyere having a cylindrical body wall parallel to said chamber wall, and concentric therewith, and spaced inwardly therefrom, said body wall having louvered slots therein oriented and disposed to impart a high velocity vortical whirl to the gas-volatile vapor mixture whereby to impel entrained liquids or solids to the chamber wall.

8. Apparatus for vaporizing and separating a more volatile component from a less volatile component in a liquid, comprising an elongated generally cylindrical evaporator chamber having closed end heads at opposed ends, one end constituting an inlet end and the other end a discharge end, a gas inlet port near said inlet end for admitting a carrier gas, a liquid inlet port also near said inlet end for admitting said liquid, a gas outlet port near said discharge end, a liquid outlet port also near said discharge end, means for heating an intermediate wall portion of said evaporator chamber between said ends, consisting of a steam chest, whereby to make the heated wall portion a heat transfer surface, deflector supporting means extending through the closed end head at the inlet end of said evaporator chamber, and extending axially along said chamber towards, but short of, said discharge end, a series of spaced deflectors carried on said deflector supporting means, each said deflector having a plurality of radially extending vanes of inclined pitch whereby to deflect gas or liquid passing thereby towards said heat transfer surface, and a tuyere element on the inner end of said deflector supporting means, said tuyere having a cylindrical louvered wall, and a conical outturned lip extending out towards said heat transfer surface whereby to permit liquid to flow along said surface past said lip but to cause gas to pass through said louvered wall so as to impart a vortical whirl thereto.

9. Apparatus as defined in claim 8 wherein the pitch of said deflector vanes progressively increases with increasing distance from said inlet end.

10. Apparatus as defined in claim 8 wherein said gas and liquid inlet ports are tangentially disposed at their points of entry to said evaporator chamber.

11. Apparatus as defined in claim 8 wherein additional deflector means is disposed between said gas inlet port and said liquid inlet port, and wherein said liquid inlet port is situated between said additional deflector means and the discharge end of said chamber.

12. Apparatus for vaporizing and separating a volatile solvent from vegetable oil miscella, comprising an elongated tubular body, means for closing both ends of said body, one end constituting an inlet end and the other end constituting a discharge end, a tubular sleeve within and concentric with said tubular body whereby to define therebetween a chamber annular in transverse section, means for introducing steam to said annular chamber whereby to heat said sleeeve to make it a heat transfer surface, a gas inlet port near said inlet end, a miscella inlet port near said inlet end, an oil outlet port near said discharge end, a gas outlet port near said discharge end, deflector carrying means depending axially within said sleeve and supported from said inlet end, a series of vaned deflectors on said deflector carrying means, spaced from each other and each extending transversely close to, but short of, contact with said sleeve whereby to impel gas or liquid outwardly to contact with said heat transfer surface, and a tuyere element on the end of said deflector carrying means remote from said inlet end, said tuyere having a cylindrical louvered wall and a conical out-turned lip extending out towards said heat transfer surface whereby to permit oil to flow along said surface past said lip but to cause gas and vaporized solvent to pass through said louvered wall so as to acquire a high velocity vortical whirl while in its path to said gas outlet port.

13. Apparatus as defined in claim 12 wherein the wall of said heat chest nearest said inlet ports is frusto conically tapered from said tubular body wall towards said sleeve wall, the base of the cone being towards said inlet ports.

14. Apparatus as defined in claim 12 wherein the deflector vanes vary in pitch from one deflector to the next, the pitch increasing in the direction of the outlet ports.

15. Apparatus as defined in claim 12 wherein the deflector carrying means is divided into a plurality of increments, and means for releasably maintaining said increments in axially aligned, contacting relationship end to end.

16. A heat exchanger for use in conjunction with a liquid, comprising an elongated generally cylindrical evaporator chamber having opposed inlet and discharge ends, a gas inlet port for admitting a carrier gas under pressure near said inlet end, a liquid inlet port for admitting said liquid near said inlet end, a gas outlet port near said discharge end, a liquid outlet port near said discharge end, heating means surrounding and extending along an intermediate portion of the chamber wall so as to make said intermediate portion a heat transfer surface, and a series of fixed deflector elements spaced progressively along said chamber having deflector portions angularly inclined to the cylindrical axis, and also inclined to a transverse plane normal to said axis, whereby to centrifugally impel said gas and liquid outwardly towards said heat transfer surface, whereby the more volatile component is vaporized and discharged through said gas outlet port.

17. A heat exchanger for use in conjunction with a liquid, comprising an elongated generally cylindrical evaporator chamber having opposed inlet and discharge ends, a gas inlet port for admitting a carrier gas under pressure near said inlet end, a liquid inlet port for admitting said liquid near said inlet end, a gas outlet port near said discharge end, a liquid outlet port near said discharge end, heating means surrounding and extending along an intermediate portion of the chamber wall so as to make said intermediate portion a heat transfer surface, and a series of fixed deflector elements spaced progressively along said chamber having deflector portions angularly inclined to the cylindrical axis, and also inclined to a transverse plane normal to said axis, whereby to centrifugally impel said gas and liquid outwardly towards said heat transfer surface, whereby the more volatile component is vaporized and discharged through said gas outlet port, and additional heating means consisting of a tubular member extending axially through said chamber to provide a second heat transfer surface therein.

18. A heat exchanger of the type defined in claim 17 wherein said additional heating means comprising a pair of concentrically disposed tubes of different diameters, and means for introducing steam and causing it to travel through one said tube along the length of said chamber, and to return within the other said tube and leave said chamber near its point of entry.

References Cited in the file of this patent
UNITED STATES PATENTS 132,264     Eames et al. _____ Oct. 15, 1872